United States Patent Office 3,135,762
Patented June 2, 1964

3,135,762
BIS(BENZOXAZOLYL)THIOPHENE COMPOUNDS
Erwin Maeder, Muenchenstein, Peter Liechti, Binningen, Max Duennenberger, Birsfelden, and Adolf Emil Siegrist, Basel, Switzerland, assignors to Ciba Limited, Basel, Switzerland, a company of Switzerland
No Drawing. Filed Jan. 10, 1962, Ser. No. 165,315
Claims priority, application Switzerland Jan. 19, 1961
6 Claims. (Cl. 260—307)

The present invention provides new valuable derivatives of thiophene corresponding to the general formula (1)

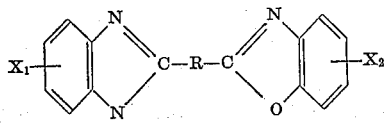

where R represents a thiophene radical bound in positions 2 and 5 to the oxazole rings; $X_1$ represents a non-aromatic hydrocarbon radical with at most 22 carbon atoms and $X_2$ a hydrogen or chlorine atom or a non-aromatic hydrocarbon radical with at most 22 carbon atoms and $X_1$ and $X_2$ together contain at least 4 carbon atoms. Accordingly, the present invention provides symmetric and asymmetric 2:5-di-[benzoxazolyl-(2′)]-thiophene compounds.

Among the new thiophene derivatives of the composition defined above those are especially valuable which correspond to the formula (2)

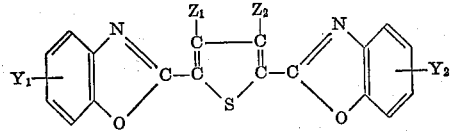

where $Y_1$ represents a saturated non-aromatic hydrocarbon radical with at most 12 carbon atoms and $Y_2$ a hydrogen or chlorine atom or a saturated non-aromatic hydrocarbon radical with at most 12 carbon atoms and $Y_1$ and $Y_2$ together contain at least 4 carbon atoms; and $Z_1$ and $Z_2$ may be identical or different and each represents a hydrogen atom or a hydrocarbon radical with 1 to 10 carbon atoms, for example a methyl, ethyl, tertiary butyl, phenyl, tolyl, benzyl or cyclohexyl group.

As saturated non-aromatic hydrocarbon radicals there may be mentioned the straight-chain or branched alkyl groups of the formula (3)  $-C_nH_{2n+1}$ where $n$ is an integer from 2 to 22, preferably from 2 to 12, and also cycloalkyl groups, more especially the cyclohexyl group.

The new derivatives of thiophene corresponding to the above general Formula 1 are obtained by reacting in the molecular ratio of 2:1, at an elevated temperature and preferably in the presence of a catalyst, at least one ortho-hydroxyaminobenzene with a dicarboxylic acid of the formula (4)  HOOC—R—COOH where R represents a thiophene radical bound in positions 2 and 5 to the carboxyl groups, or by reaction with a functional derivative of said dicarboxylic acid, using an ortho-hydroxybenzene of the formula (5)

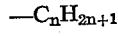

or (6)

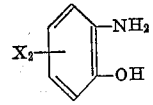

where $X_1$ represents a non-aromatic hydrocarbon radical with at most 22 carbon atoms and $X_2$ represents a hydrogen or chlorine atom or a non-aromatic hydrocarbon radical with at most 22 carbon atoms and $X_1$ and $X_2$ together contain at least 4 carbon atoms.

Particularly suitable starting materials are, for example, the ortho-hydroxyaminobenzenes that contain as further substituent a saturated, non-aromatic hydrocarbon radical with at least 2, for example 4, 6, 8 or 12, carbon atoms. As examples there may be mentioned 1-amino-2-hydroxy-5-alkylbenzenes corresponding to the formula (7)

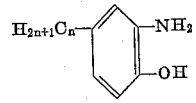

where $n$ is an integer from 2 to 22, preferably from 2 to 12, and whose alkyl group may be straight or branched, for example the compounds of the following formulae:

(8)

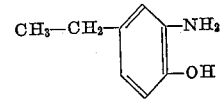

(9)

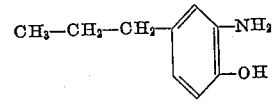

(10)

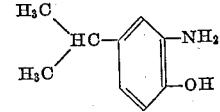

(11)

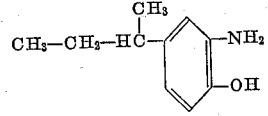

(12)

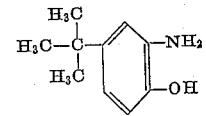

(13)

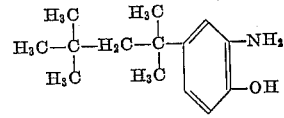

(14)

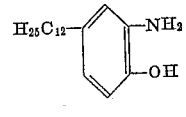

furthermore 1-amino-2-hydroxy-cycloalkylbenzenes, more especially 1-amino-2-hydroxy-5-cyclohexylbenzene.

As further starting material there is used a dicarboxylic acid of the Formula 4, for example thiophene-2:5-dicarboxylic acid, 3:4- dimethylthiophene-2:5-dicarboxylic acid, 3:4-diphenylthiophene-2:5-dicarboxylic acid or monomethyl- or monophenyl-thiophene-2:5-dicarboxylic acid, or a functional derivative of said dicarboxylic acids, for example a dinitrile or an ester. Particularly suitable esters are those with lower aliphatic alcohols, for example the dimethyl or diethyl ester.

The reaction of the components concerned is carried out by heating them at elevated temperatures, for example at 160 to 260° C., advantageously in an inert gas, for example nitrogen. It is of advantage to perform the reaction in the presence of a catalyst. Suitable catalysts are for example, boric acid, zinc chloride, para-toluene-sulfonic acid, also polyphosphoric acids including pyrophosphoric acid. When the reaction is performed with boric acid as catalyst, it is of advantage to use the acid in an amount of about 0.5 to 5% calculated on the total weight of the reaction batch. It is possible to use concomitantly high-boiling polar organic solvents, for example dimethyl formamide or aliphatic, optionally etherified, hydroxyl compounds, for example propylene glycol, ethylene glycol monoethyl ether or diethylene glycol diethyl ether.

The new thiophene derivatives of the composition defined above display in the dissolved or finely dispersed state a more or less distinct fluorescence. They can be used for optically brightening a wide variety of materials, more especially organic materials. Good results are achieved, for example, in brightening acrylic resin lacquers, alkyd resin lacquers, cellulose ester lacquers, for example acetylcellulose lacquers or nitrocellulose ester lacquers. The new thiophene derivatives are particularly suitable for optically brightening synthetic fibers, for example fibers of cellulose esters such as cellulose propionate or acetylcellulose (cellulose diacetate or triacetate; acetate rayon) polyamides (for example nylon) or fibers or polyolefines such as polyethylene or polypropylene, as well as films, foils, tapes or shaped structures of these materials or other materials such as polystyrene, polyvinyl alcohol or polyvinyl esters of organic acids, for example polyvinyl acetate.

If it is desired to optically brighten by the present process synthetic fibers, which may be in the form of staple fibers or monofils, in the crude state, in the form of hanks or fabrics, it is of advantage to work in an aqueous suspension of the compounds concerned. If desired there may be further added to the treatment bath a dispersing agent such, for example, as a soap, a polyglycol ether of a fatty alcohol, fatty amines or alkylphenols, cellulose sulfite waste liquor or condensation products of optionally alkylated naphthalenesulfonic acids with formaldehyde. It is particularly advantageous to work in a neutral, weakly alkaline or acidic bath. Likewise, it is of advantage to perform the treatment at an elevated temperature ranging from about 50 to 100° C., for example at the boiling temperature of the bath or in its vicinity (about 90° C.). The improvement according to the present process may also be carried out with solutions in organic solvents.

Furthermore, the new thiophene derivatives to be used according to this invention may also be added to, or incorporated with, the materials to be brightened before or during the shaping of the latter. Thus, they may be added to the moulding composition during the manufacture of films, foils, tapes or shaped products, or they may be dissolved or finely dispersed in the spinning mass before the spinning operation. The new thiophene derivatives may also be added to the reaction mixture before or during the polycondensation leading, for example, to polyamides, or they may be added before or during the polymerization of monomers such, for example, as vinyl acetate to the polymerization batch.

The amount of the new thiophene derivative to be used according to the invention, calculated on the material to be optically brightened, may vary within wide limits. Even a very small amount—in certain cases for example 0.01%—will produce a distinct and durable effect, but it is also possible to use an amount of up to about 2%.

The new thiophene derivatives serving as brightening agents may also be used as follows:

(a) In admixture with dyestuffs or pigments or as additives to dyebaths, printing, discharge or resist pastes. Furthermore, for after-treating dyeings, prints or discharge effects.

(b) In admixture with chemical bleaches or as additives to bleaching baths.

(c) In admixture with finishing agents such as starch or synthetically produced finishing agents. The products of the invention may also be added, for example, to liquors used for producing a crease-resistant finish.

(d) In combination with detergents. The detergent and the brightening agent may be added separately to the liquors used. It is also advantageous to use a detergent in the form of a mixture with a brightening agent. Suitable detergents are, for example, soaps, salts of sulfonate detergents, such for example as sulfonated benzimidazoles substituted by higher alkyl radicals at carbon atom 2; furthermore salts of monocarboxylic acid esters of 4-sulfophthalic acid with higher fatty alcohols; furthermore salts of fatty alcohol sulfonates, alkyl-aryl sulfonic acids or condensation products of higher fatty acids with aliphatic hydroxysulfonic or aminosulfonic acids. Furthermore there may be used non-ionic detergents, for example polyglycol ethers derived from ethylene oxide and higher fatty alcohols, alkyl phenols or fatty amines.

When the present process is combined with other treatment or improving methods, the combined treatment is advantageously performed with the aid of a suitable preparation. These stable preparations contain compounds of the above Formula 1 as well as dispersing agents, detergents, dyestuffs, pigments or finishing agents. The compounds of the above Formula 1 may also be used fixed on a finely dispersed substratum.

Unless otherwise indicated, parts and percentages in the following examples are by weight.

EXAMPLE 1

A mixture of 370 parts of 1-hydroxy-2-amino-4-(1′ methyl-propyl)-benzene, 172 parts of thiophene-2:5-dicarboxylic acid and 6 parts of boric acid is heated for 1½ hours in an oil bath under nitrogen at 230° C., during which water escapes and a homogeneous melt is formed. After cooling to below 100° C., 2000 parts by volume of ethanol are added, whereby at an elevated temperature a dark solution is obtained which is stirred into 10,000 parts by volume of sodium hydroxide solution of 4% strength. The precipitate formed is suctioned off, washed with water until the washings run neutral and covered with methanol. After drying there are obtained about 343 parts of the compound of the formula (15)

H₃C—H₂C—HC(CH₃)—[benzoxazole]—C=C(S)—C=C—[benzoxazole]—CH(CH₃)—CH₂—CH₃ in the form of a light-beige powder melting at 104 to 105° C.

After four recrystallizations from ethanol there are obtained light-yellow, lustrous flakes melting at 105.5 to 106° C. having the following analytical data:

|  | C, percent | H, percent |
| --- | --- | --- |
| $C_{26}H_{28}N_2O_3S$: |  |  |
| Calculated | 72.53 | 6.09 |
| Found | 72.42 | 6.23 |

The compound of the Formula 15 can be used for optically brightening materials of polyolefines, for example of polyethylene.

EXAMPLE 2

When in Example 1, which describes the manufacture of the compound of the Formula 15, 1-hydroxy-2-amino-4-(1'-methylpropyl)-benzene is replaced by an equivalent amount of one of the compounds of the following formulae

(12) 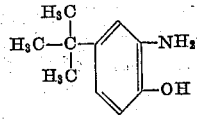

(10) 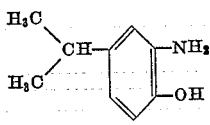

(13) 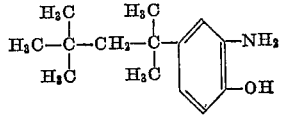

(14) 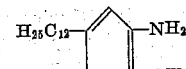

(8) 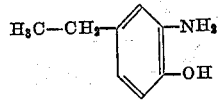

(16) 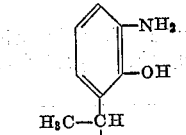

(17) 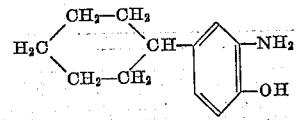

an analogous condensation gives an approximately identical yield of the corresponding compounds of the following formulae:

(18) 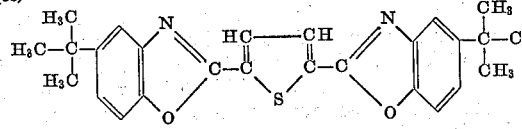

[Small, yellowish needles from dioxane+ethanol, melting at 199 to 200° C.]

| | C | H |
|---|---|---|
| $C_{26}H_{26}N_2O_2S$: | | |
| Calculated | 72.53 | 6.09 |
| Found | 72.73 | 6.17 |

(19) 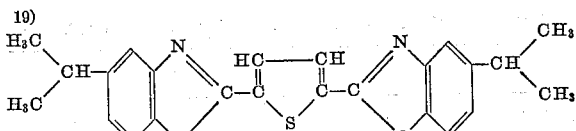

[Yellowish flakes from dioxane+ethanol, melting at 142 to 142.5° C.]

| | C | H | N |
|---|---|---|---|
| $C_{24}H_{22}N_2O_2S$: | | | |
| Calculated | 71.61 | 5.51 | 6.96 |
| Found | 71.34 | 5.42 | 6.97 |

(20) 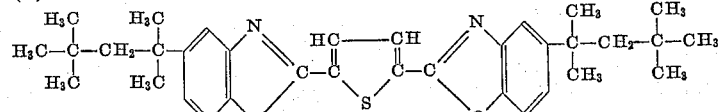

[Yellowish, crystalline powder from dioxane+ethanol, melting at 200 to 201° C.]

| | C | H | N |
|---|---|---|---|
| $C_{34}H_{42}N_2O_2S$: | | | |
| Calculated | 75.24 | 7.80 | 5.16 |
| Found | 75.13 | 7.63 | 5.35 |

(21) 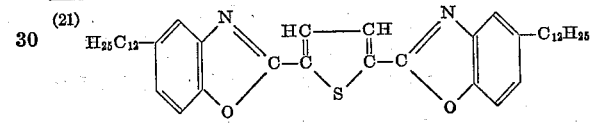

[Yellowish, resinous product after repeated chromatography on alumina

| | C | H | N |
|---|---|---|---|
| $C_{42}H_{58}N_2O_2S$: | | | |
| Calculated | 77.02 | 8.92 | 4.28 |
| Found | 77.35 | 9.10 | 4.26 |

(22) 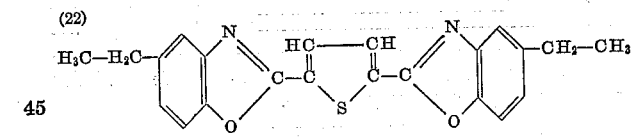

[Yellowish, crystalline precipitate from dioxane+ethanol, melting at 147 to 147.5° C.]

| | C | H | N |
|---|---|---|---|
| Analysis.—$C_{22}H_{18}N_2O_2S$: | | | |
| Calculated | 70.56 | 4.85 | 7.48 |
| Found | 70.44 | 4.84 | 7.21 |

(23) 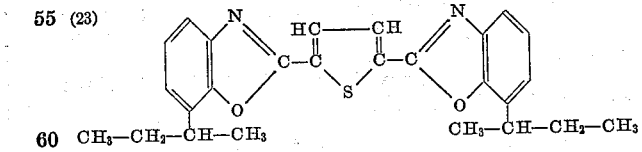

[Small, yellowish, crystalline needles from cyclohexane+ethanol, melting at 144 to 144.5° C.]

| | C | H | N |
|---|---|---|---|
| Analysis.—$C_{20}H_{26}N_2O_2S$: | | | |
| Calculated | 72.53 | 6.09 | 6.51 |
| Found | 71.99 | 6.11 | 6.48 |

(24) 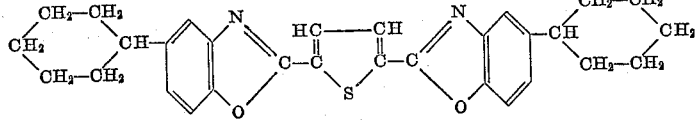

[Light-yellow tinsel from dioxane, melting at 233 to 233.5°C.]

| Analysis.—$C_{30}H_{28}N_2O_2S$: | C | H |
|---|---|---|
| Calculated | 74.97 | 5.87 |
| Found | 75.13 | 6.11 |

The compounds of the Formulae 18 to 24 can be used for optically brightening, for example, acetyl-cellulose or polyethylene.

EXAMPLE 3

86 parts of thiophene-2:5-dicarboxylic acid with 151 parts of 3-amino-4-hydroxy-1-n-propylbenzene in 1000 parts of 1:2-propylene glycol are heated with stirring in an oil bath to 160° C. under nitrogen. 2 parts of anhydrous zinc chloride are added to the resulting solution and the bath temperature is raised so that within 6 hours 900 parts of propylene glycol pass over together with the eliminated water. The mixture is then cooled to below 110° C. and 400 parts of formic acid are dropped in. The precipitate formed is suctioned off at room temperature and washed with a small amount of methanol. After drying there are obtained about 115 parts of the compound of the formula (25)

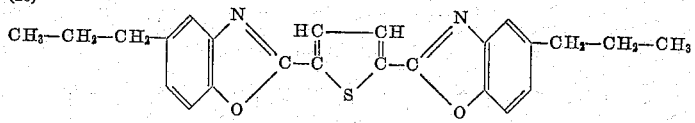

in the form of a yellowish powder melting at 149.5 to 150.5° C.

On recrystallization from ethanol there are obtained very fine, pale-yellow needles melting at 151° C., which display the following analytical data:

| | C, percent | H, percent | N, percent |
|---|---|---|---|
| $C_{24}H_{22}N_2O_2S$: | | | |
| Calculated | 71.61 | 5.51 | 6.96 |
| Found | 71.46 | 5.22 | 7.00 |

The compound of the Formula 25 can be used for optically brightening polyethylene.

EXAMPLE 4

A mixture of 6 parts of 3:4-dimethyl-thiophene-2:5-dicarboxylic acid, 12.5 parts of 1-hydroxy-2-amino-4-tertiary butylbenzene and 0.5 part of boric acid is heated in an oil bath at 230° to 240° C. for 1½ hours under nitrogen, during which water escapes and a clear melt is formed which is dissolved in 20 parts by volume of dimethyl formamide and the reaction product is precipitated by adding alcohol dropwise. After cooling, the reaction product is suctioned off, expressed and washed with methanol.

After drying, there are obtained about 8.5 parts of the compound of the formula (26)

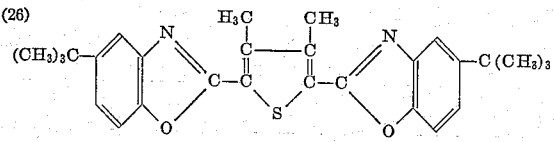

in the form of a beige powder melting at 236 to 236.5° C. Recrystallization from chlorobenzene+ethanol yields small, yellowish, felted needles melting at 237 to 237.5° C.

| | C, percent | H, percent | N, percent |
|---|---|---|---|
| $C_{28}H_{30}N_2O_2S$: | | | |
| Calculated | 73.33 | 6.59 | 6.23 |
| Found | 73.38 | 6.64 | 6.11 |

When in this example 1-hydroxy-2-amino-4-tertiary butyl-benzene is replaced by an equivalent amount of 1-hydroxy-2-amino-4-ethylbenzene and analogous condensation is performed, an approximately identical yield is obtained of the compound of the formula (27)

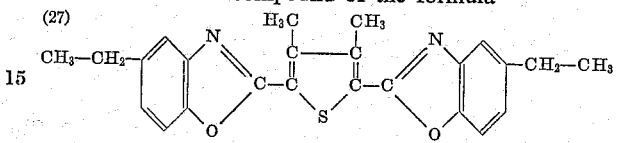

in small, yellowish needles melting at 195 to 196° C. from dioxane.

| | C | H | N |
|---|---|---|---|
| $C_{24}H_{22}N_2O_2S$: | | | |
| Calculated | 71.61 | 5.51 | 6.96 |
| Found | 71.49 | 5.51 | 7.07 |

When in this example 1-hydroxy-2-amino-4-tertiary butyl-benzene is replaced by an equivalent amount of 1-hydroxy-2-amino-4-dodecylbenzene, an analogous condensation yields the compound of the formula (28)

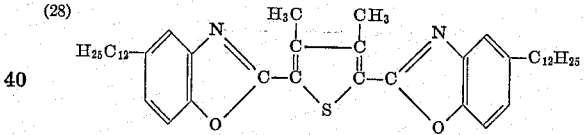

in the form of a yellowish resin, which does not flow at room temperature, after repeated chromatography on alumina.

| | C | H | N |
|---|---|---|---|
| $C_{44}H_{62}N_2O_2S$: | | | |
| Calculated | 77.37 | 9.18 | 4.10 |
| Found | 77.35 | 9.30 | 3.82 |

The compounds of the Formulae 26, 27 and 28 can be used for optically brightening polyethylene.

EXAMPLE 5

6 parts of 3:4-dimethyl-thiophene-2:5-dicarboxylic acid and 9 parts of 1-hydroxy-2-amino-4-n-propyl-benzene in 50 parts by volume of 1:2-propylene glycol are heated with stirring to 160° C. in an oil bath under nitrogen, to yield a clear solution. 1.5 parts of anhydrous zinc chloride are added and the temperature of the boil bath is raised to a degree such that within 6 hours 45 parts of propylene glycol pass over together with the water of reaction formed.

20 parts by volume of concentrated formic acid are then dropped into the reaction mixture. After cooling to room temperature the precipitate is suctioned off and washed with methanol.

After drying there are obtained about 5 parts of the compound of the formula (29)

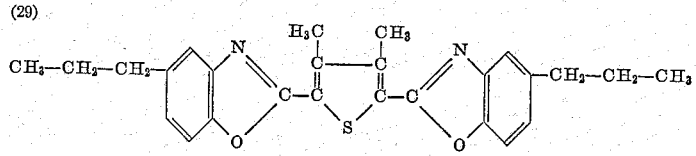

in the form of a yellow powder melting at 179 to 180° C.

On recrystallization from dioxane+ethanol it forms yellowish prisms melting at 180 to 180.5° C.

|  | C, percent | H, percent | N, percent |
|---|---|---|---|
| $C_{26}H_{26}N_2O_2S$: |  |  |  |
| Calculated | 72.53 | 6.09 | 6.51 |
| Found | 72.60 | 6.10 | 6.53 |

The new compound can be used for optically brightening polyethylene.

EXAMPLE 6

6.5 parts of 3:4-diphenyl-thiophene-2:5-dicarboxylic acid are mixed with 10 parts of 1-hydroxy-2-amino-4-tertiary butyl-benzene and 0.2 parts of boric acid, and the whole is heated under nitrogen in an oil bath for 1½ hours at 250° C., during which water escapes and a clear melt is formed which is dissolved in 15 parts by volume of dimethylformamide. 35 parts by volume of ethanol are added, the whole is cooled to room temperature, suction-filtered and washed with methanol. After drying there are obtained about 10 parts of the compound of the formula (30)

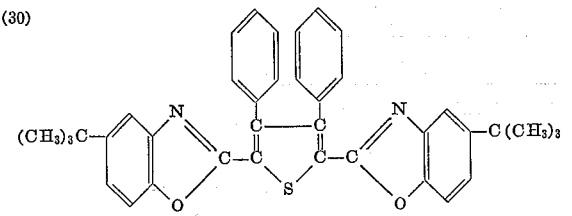

in the form of a yellow powder which melts at 255 to 258° C.; after recrystallization from chlorobenzene+ethanol it forms small yellow needles melting at 262.5 to 263° C.

|  | C, percent | H, percent | N, percent |
|---|---|---|---|
| $C_{38}H_{34}N_2O_2S$: |  |  |  |
| Calculated | 78.32 | 5.88 | 4.81 |
| Found | 78.41 | 5.90 | 4.78 |

The compound of the Formula 30 can be used, for example, for optically brightening polyethylene.

By a similar reaction of 24.8 parts of 3-phenylthiophene-2:5-dicarboxylic acid, 38 parts of 1-hydroxy-2-amino-4-tertiary butyl-benzene and 1 part of boric acid there is obtained the compound of the formula (40)

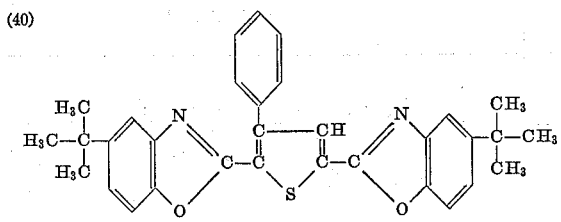

Yield: 25 parts of a yellow crystalline powder which melts at 176.5 to 178.5° C.; after recrystallization from cyclohexane it forms a light-yellow finely crystalline powder melting at 179 to 180° C.

|  | C, percent | H, percent | N, percent |
|---|---|---|---|
| $C_{32}H_{30}O_2N_2S$: |  |  |  |
| Calculated | 75.86 | 5.97 | 5.53 |
| Found | 75.87 | 6.03 | 5.26 |

EXAMPLE 7

(31) 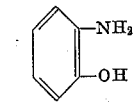

(32) 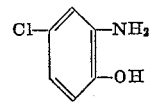

(12) 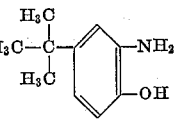

(14) 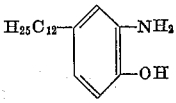

0.115 mol each of the compounds 31 and 12, or of the compounds 31 and 33 or of the compounds 31 and 14, or the compounds 32 and 12, are intimately mixed with 0.1 mol of thiophene-2:5-dicarboxylic acid and 1 gram of boric acid, heated within about 45 minutes to 240 to 250° C. and stirred at this temperature for about 2 hours, during which water distils off. The melt is comminuted, extracted with 200 to 400 cc. of hot carbon tetrachloride and the extract is separated into its constituents on alumina of the chromatographic activity stage 1 (according to Brockmann).

By using as eluant carbon tetrachloride, methylene chloride, chloroform and mixtures thereof, there are obtained in addition to resinous, colored by-products in each case substantially 2 symmetric products and a symmetric product of the formulae shown in Table I.

*Table I*

| No. | Compound obtained | Analysis and purification | | | | Melting point |
|---|---|---|---|---|---|---|
|  |  |  | C | H | N |  |
| 34 | (structure) | Calculated | 67.91 | 3.17 | 8.80 | 216–217° C. |
|  |  | Found | 67.96 | 3.11 | 8.92 |  |
|  |  | 4 x perchloroethylene | | | | |
|  |  |  | C | H | N |  |
| 35 | (structure) | Calculated | 70.56 | 4.85 | 7.48 | 188–189° C. |
|  |  | Found | 70.19 | 4.80 | 7.30 |  |
|  |  | 4 x perchloroethylene | | | | |

*Table I—Continued*

| No. | Compound obtained | Analysis and purification | | | | Melting point |
|---|---|---|---|---|---|---|
| | | | C | H | N | |
| 18 | [structure] | Calculated | 72.53 | 6.09 | | 199–200° C. |
| | | Found | 72.73 | 6.17 | | |
| | | 3 x dioxane + ethanol | | | | |
| 36 | [structure] | Calculated | 70.56 | 4.85 | 7.48 | 136–137° C. |
| | | Found | 70.62 | 4.74 | 7.47 | |
| | | 4 x perchloroethylene | | | | |
| 23 | [structure] | Calculated | 72.53 | 6.09 | 6.51 | 144–144.5° C. |
| | | Found | 71.99 | 6.15 | 6.66 | |
| | | 3 x cyclohexane | | | | |
| 37 | [structure] | Calculated | 74.04 | 7.04 | 5.76 | 97–99° C. |
| | | Found | 73.93 | 6.97 | 5.86 | |
| | | 4 x petroleum ether | | | | |
| 21 | [structure] | Calculated | 77.02 | 8.93 | 4.28 | Yellowish resinous product after repeated chromatography on alumina. |
| | | Found | 77.35 | 9.10 | 4.26 | |
| 38 | [structure] | Calculated | 55.83 | 2.08 | 7.23 | 297–299° C. |
| | | Found | 56.21 | 1.94 | 7.33 | |
| | | 3 x dioxane | | | | |
| 39 | [structure] | Calculated | 64.62 | 4.19 | 7.84 | 226–227° C. |
| | | Found | 64.48 | 4.18 | 7.80 | |
| | | 3 x perchloroethylene | | | | |

The yields and eluants are listed in Table II.

*Table II*

| o-Aminophenols used corresponding to formulae | Resulting compound of the formula | Eluant | Yield | |
|---|---|---|---|---|
| | | | In grams | In percent |
| (31) + (12) | (18) | CCl₄ | 8.6 | 20.0 |
| | (35) | CH₂Cl₂ | 9.4 | 25.1 |
| | (34) | CHCl₃ | 2.0 | 6.3 |
| (31)+(35) | (23) | CCl₄:CH₂Cl₂=9:1 | 3.6 | 8.4 |
| | (36) | CCl₄:CH₂Cl₂=1:1 | 9.2 | 24.6 |
| | (34) | CH₂Cl₂ | 5.6 | 17.6 |
| (31)+(14) | (21) | CCl₄ | 8.0 | 12.4 |
| | (37) | CH₂Cl₂ | 22.0 | 45.0 |
| | (34) | CHCl₃ | 6.1 | 18.6 |
| (32)+(12) | (18) | Elution throughout with CHCl₃. | | |
| | (39) | On extracting the eluate with CCl₄, compound of formula (39) is left. | 2.3 | 5.6 |
| | (38) | | | |

The compounds of the Formulae 35, 36, 37 and 39 and the mixtures of the compounds of the Formulae 18, 35, 34, or 23, 36, 34 or 21, 37, 34 can be used as optical brighteners for polyamides, acetylcellulose and polyethylene.

EXAMPLE 8

Polypropylene fibers are treated at a goods-to-liquor ratio of 1:40 with 0.1% of the compound of the Formula 18 for 60 minutes at 60 to 100° C. in a bath containing, per liter, 5 grams of an adduct of about 35 mols of ethylene oxide with 1 mol of octadecyl alcohol, and 0.5 gram of trisodium phosphate. The material is then rinsed and dried. The polypropylene fibers treated as described possess a substantially higher white content than the untreated fibers.

When 1 gram of formic acid of 85% strength is used instead of 0.5 gram of trisodium phosphate, a similar result is obtained.

EXAMPLE 9

Polyethylene fibers are treated at a goods-to-liquor ratio of 1:40 with 0.1% of the product of the Formula 19 for 60 minutes at 60 to 100° C. in a bath containing, per liter, 5 grams of an adduct of about 35 mols of ethylene oxide with 1 mol of octadecyl alcohol, and 0.5 gram of trisodium phosphate. The material is then rinsed and dried. The polyethylene fibers treated as described possess a substantially higher white content than the untreated fibers.

When 1 gram of formic acid of 85% strength is used instead of 0.5 gram of trisodium phosphate, a similar result is obtained.

EXAMPLE 10

100 parts of polyethylene (Alkathene WNG 14) are rolled on a warm calender to form a homogeneous foil. 0.02 part of the compound of the Formula 19 is worked into this foil. The foil is pulled off the calender and then pressed between steel platens heated at 130 to 135° C. to smooth the foil on both sides.

The polyethylene foil manufactured in this manner possesses a substantially higher white content than a foil which does not contain the compound of the Formula 19.

When the compound of the Formula 19 is replaced by an equal amount of the compound of the Formula 25 or of the compound of the Formula 27, similar brightening effects are achieved.

EXAMPLE 11

100 parts of polyethylene (Alkathene WNG 14) are rolled on a warm calender to form a homogeneous foil. 0.02 to 0.08 part of the compound of the Formula 18 and 0.5 part of titanium dioxide are worked into the foil. The foil is then pulled off the calender and pressed between steel platens at 130 to 135° C. to smooth the foil on both sides.

The resulting opaque polyethylene foil possesses a substantially higher white content than a foil that does not contain the compound of the Formula 18.

EXAMPLE 12

100 parts of polyethylene (Alkathene WNG 14) are rolled on a calender at 130° C. to form a homogeneous foil. 0.02 part of the compound of the Formula 29 or of the compound of the Formula 27 is then slowly worked into the foil. After 5 minutes the foil is taken off the calender and pressed to form a panel on a press heated at 130 to 135° C.

The resulting polyethylene material possesses a substantially higher white content than a comparable material that does not contain the compound of the Formula 29 or 27.

Similar brightening effects are achieved by using instead of the compound of the Formula 29 or 27 an equal amount of the compound of the Formula 26 or 30.

EXAMPLE 13

Acetylcellulose fibers are treated at a goods-to-liquor ratio from 1:10 to 1:40 with 0.02 to 0.2% of 2:5-di-[5'-tertiary butyl-benzoxazolyl-(2')]-thiophene of the Formula 18 for 60 minutes at 60 to 100° C. in a bath containing, per liter, 1 gram of an adduct of about 35 mols of ethylene oxide with 1 mol of octadecyl alcohol.

After having been rinsed in cold water and dried, the acetylcellulose fibers possess a substantially higher white content than the untreated fibers.

EXAMPLE 14

A solution of 0.05 to 0.2 part of 2:5-di-[5'-tertiary butyl-benzoxazolyl-(2')]-thiophene of the Formula 18 in hot acetone or dimethyl formamide is added to an acetylcellulose spinning solution of 100 parts of acetyl-cellulose (2½-acetate) and 300 parts of acetone. The mixture is intimately stirred and then spun into filaments in usual manner.

The resulting filaments possess a substantially higher white content than filaments that do not contain the compound of the Formula 18.

What is claimed is:
1. The compound of the formula

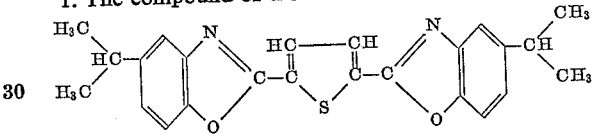

2. The compound of the formula

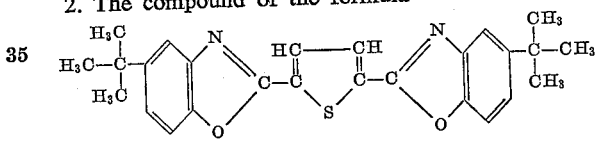

3. The compound of the formula

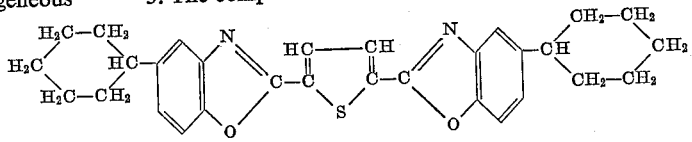

4. The compound of the formula

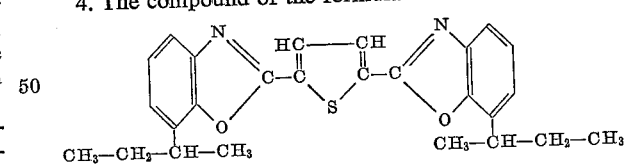

5. The compound of the formula

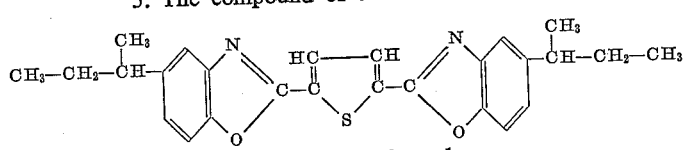

6. The compound of the formula

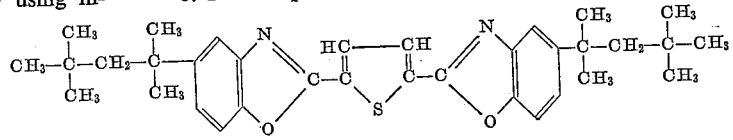

References Cited in the file of this patent
UNITED STATES PATENTS

| | | |
|---|---|---|
| 2,985,661 | Hein et al. | May 23, 1961 |
| 2,995,564 | Duennenberger et al. | Aug. 8, 1961 |
| 2,995,605 | Siegrist et al. | Aug. 8, 1961 |

FOREIGN PATENTS

| | | |
|---|---|---|
| 1,179,825 | France | Dec. 22, 1958 |

UNITED STATES PATENT OFFICE
CERTIFICATE OF CORRECTION

Patent No. 3,135,762 June 2, 1964

Erwin Maeder et al.

It is hereby certified that error appears in the above numbered patent requiring correction and that the said Letters Patent should read as corrected below.

Column 1, lines 13 to 18, for that portion of the formula reading:

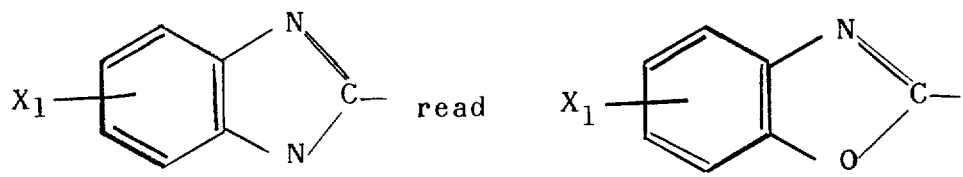

columns 9 and 10, Table I, formula No. 35, for that portion of the formula reading:

column 14, line 22, for "resplcing read -- resulting --.

Signed and sealed this 3rd day of November 1964.

(SEAL)
Attest:

ERNEST W. SWIDER
Attesting Officer

EDWARD J. BRENNER
Commissioner of Patents